United States Patent
Keshavdas et al.

(10) Patent No.: US 8,688,029 B2
(45) Date of Patent: Apr. 1, 2014

(54) RADIO ACCESS NETWORK INTEGRATED SET-TOP DEVICE

(75) Inventors: Jyothi Keshavdas, Pleasanton, CA (US); Arda Aksu, Martinez, CA (US); Lalit R. Kotecha, San Ramon, CA (US); David Chiang, Fremont, CA (US); Maria G. Lam, Oakland, CA (US); Steven R. Rados, Danville, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 15 days.

(21) Appl. No.: 13/599,671

(22) Filed: Aug. 30, 2012

(65) Prior Publication Data

US 2014/0066046 A1   Mar. 6, 2014

(51) Int. Cl.
*H04B 3/36* (2006.01)
(52) U.S. Cl.
USPC ............... 455/7; 455/11.1; 455/13.1; 455/16; 455/9; 370/332; 370/254

(58) Field of Classification Search
USPC ................ 455/7, 11.1, 13.1, 16, 419, 424, 9; 370/332, 254
See application file for complete search history.

(56) References Cited

U.S. PATENT DOCUMENTS

| | | | | |
|---|---|---|---|---|
| 5,475,683 | A * | 12/1995 | Harrison et al. | 370/332 |
| 2009/0225679 | A1 * | 9/2009 | Bims | 370/254 |
| 2010/0189013 | A1 * | 7/2010 | Bims | 370/254 |
| 2012/0202419 | A1 * | 8/2012 | O'Neill | 455/15 |
| 2012/0315894 | A1 * | 12/2012 | Dussmann | 455/424 |
| 2013/0072112 | A1 * | 3/2013 | Gunnarsson et al. | 455/9 |

\* cited by examiner

*Primary Examiner* — David Q Nguyen

(57) ABSTRACT

A device may receive a signal strength indicator associated with a connection between a mobile device and a first base station. The signal strength indicator may indicate a strength of a radio signal received by the mobile device from the first base station. The device may transmit the signal strength indicator to a network device, and may receive, from the network device, a first notification to activate a second base station based on the signal strength indicator. The device may activate the second base station based on the first notification. The second base station may provide temporary wireless connectivity for the mobile device.

20 Claims, 9 Drawing Sheets

US 8,688,029 B2

RADIO ACCESS NETWORK INTEGRATED SET-TOP DEVICE

BACKGROUND

A femtocell may be a small, low power cellular base station, typically designed for use in a home or small business. A femtocell may connect to a service provider's network via broadband (e.g., a cable line, a digital subscriber line, etc.). A femtocell may allow the service provider to extend cellular service coverage indoors.

DETAILED DESCRIPTION OF PREFERRED EMBODIMENTS

The following detailed description of example embodiments refers to the accompanying drawings. The same reference numbers in different drawings may identify the same or similar elements.

As used herein, "signal strength" may refer to a received signal strength indicator ("RSSI") value associated with a wireless connection. An RSSI value may represent a measurement of power present in a received radio signal. Additionally, or alternatively, a "signal strength" may refer to a signal to interference plus noise ratio ("SINR") value associated with a wireless connection. An SINR value may measure the quality of a wireless connection, and may be calculated as SINR=P/(I+N), where P represents signal power, I represents interference power, and N represents noise power. Additionally, or alternatively, "signal strength" may refer to an indication of a power level associated with a received radio signal, or any other indication of a signal strength associated with a wireless connection. A signal strength value may indicate that a device is not receiving a radio signal.

A communication network provider may determine the coverage area of the provider's network, such as the signal strength of a mobile device at different geographic locations. It may be difficult to determine the signal strength of a device located inside of a building because the device's signal may be blocked by physical barriers. Implementations described herein may assist network providers in determining network coverage inside of a building. Additionally, implementations described herein may allow a network provider to increase the signal strength of a device located within a building.

Figure 1:
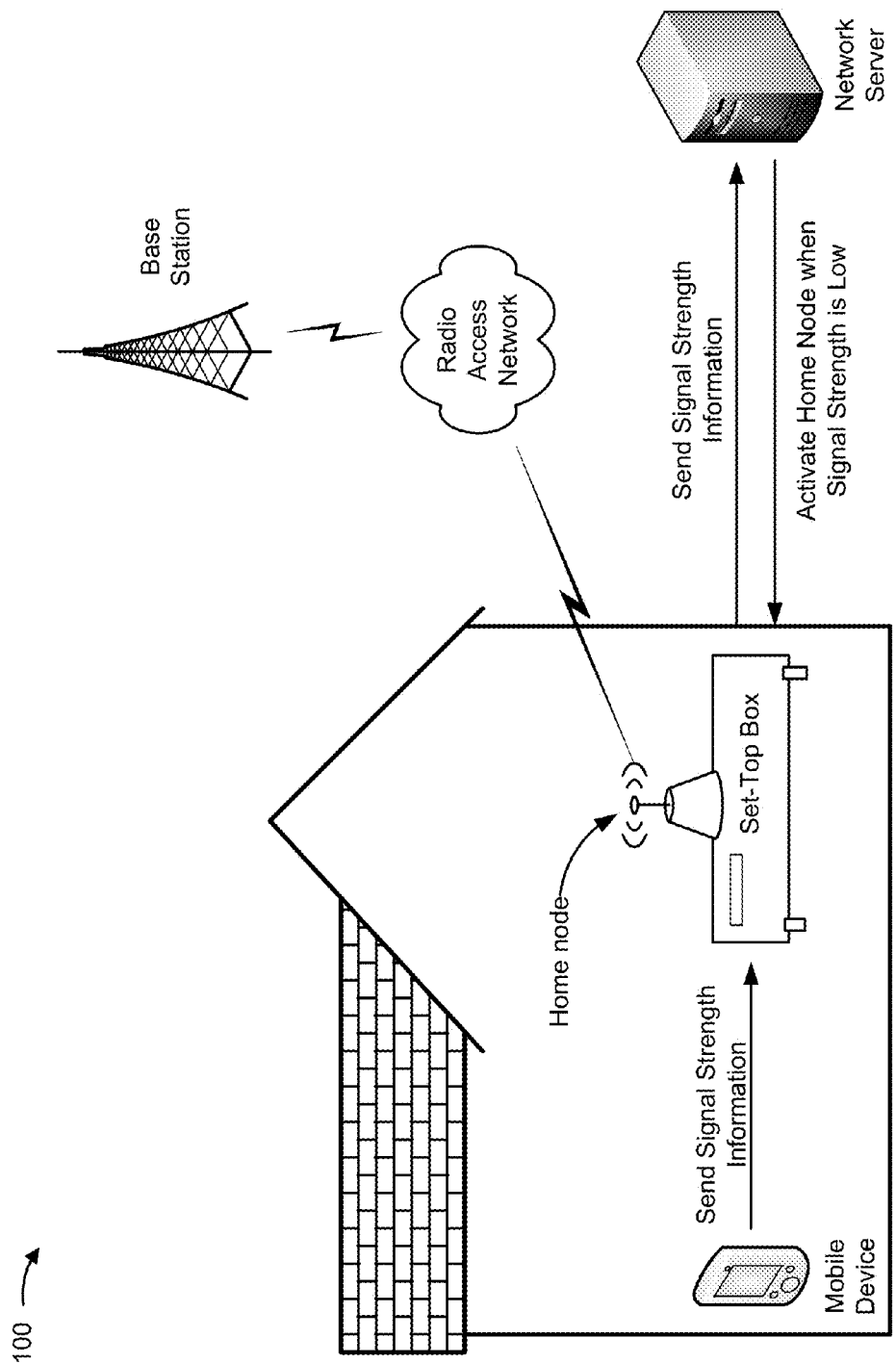
FIG. 1 is a diagram of an overview of an example implementation described herein.

FIG. 1 is a diagram of an overview 100 of an example implementation described herein. As shown in FIG. 1, the example implementation may include a mobile device, a set-top box, a home node, a network server, a base station, and a radio access network. For example, the mobile device may be a cellular telephone, the set-top box may include a television tuner, the home node may be a femtocell capable of communicating with the radio access network, the network server may be a server computer, and the base station may be a cellular base station for accessing the radio access network.

As illustrated in FIG. 1, the set-top box may receive signal strength information from the mobile device. For example, the mobile device may receive a radio signal from the base station, and may determine a power level of the radio signal. The mobile device may provide an indication of the power level (e.g., the signal strength) to the set-top box. The set-top box may include a home node (e.g., a femtocell) capable of connecting to the service provider network (e.g., via the radio access network).

The set-top box may transmit the signal strength information to the network server. The network server may determine, based on the signal strength information, that the home node should be activated (e.g., turned on), and may send a notification to the set-top box to activate the home node. For example, the network server may send a notification to the set-top box to activate the home node when the signal strength of the mobile device is lower than a threshold (and/or when there is no signal). The set-top box may activate the home node based on the received notification, which may increase the signal strength of the mobile device. The home node may also be deactivated in a similar manner.

Figure 2:
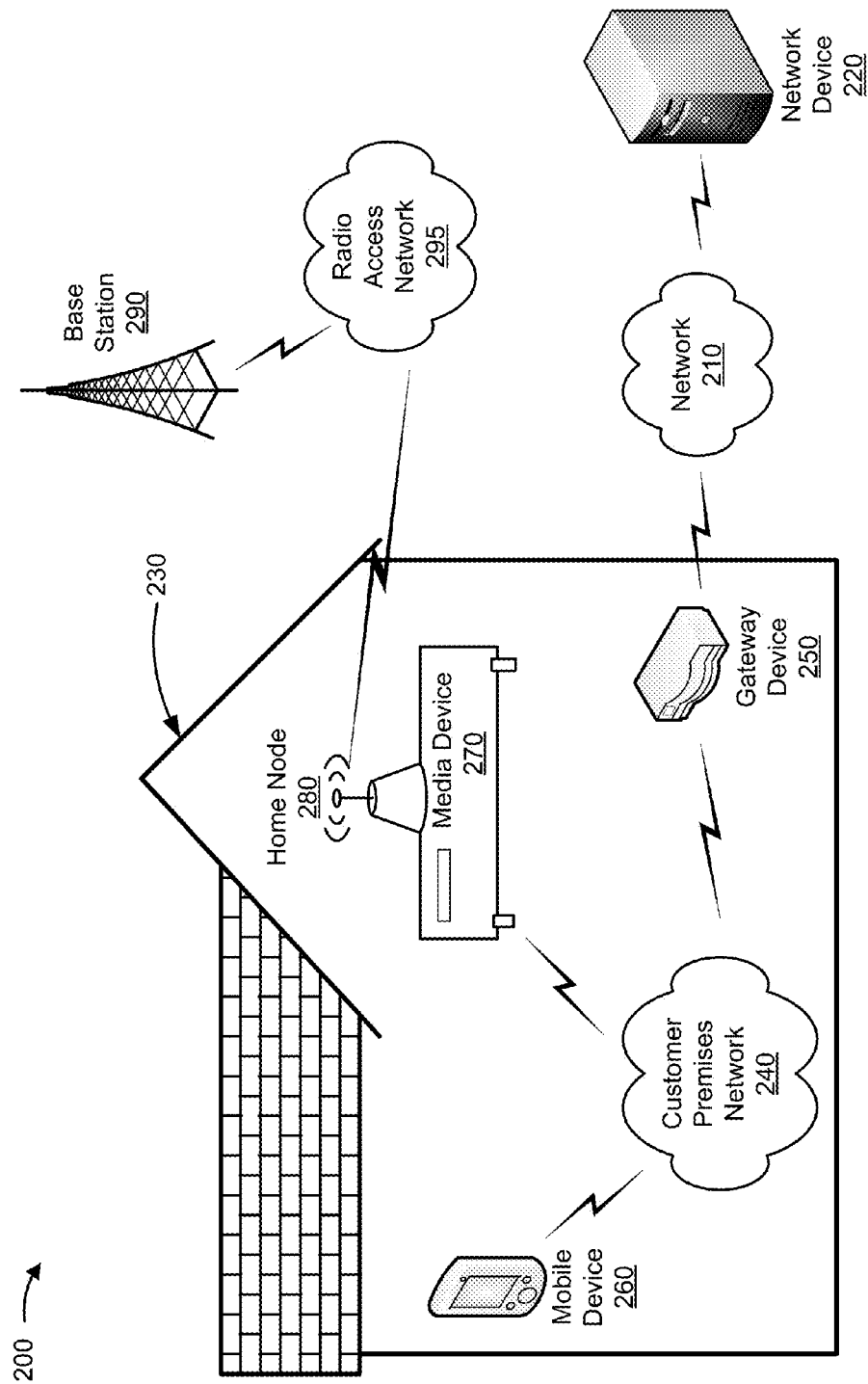
FIG. 2 is a diagram of an example environment in which systems and/or methods described herein may be implemented.

FIG. 2 is a diagram of an example environment 200 in which systems and/or methods described herein may be implemented. As illustrated, environment 200 may include a network 210, a network device 220, a customer premise 230, a customer premises network 240, a gateway device 250, a mobile device 260, a media device 270, a home node 280, a base station 290, and a radio access network 295.

Network 210 may include one or more wired and/or wireless networks. For example, network 210 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 210 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Network 210 may connect network device 220 with customer premise 230 (e.g., via gateway device 250).

Network device 220 may include a computation and/or communication device that is capable of communicating with gateway device 250, mobile device 260, media device 270, home node 280, and/or a network (e.g., network 210 and/or customer premises network 240). For example, network device 220 may include a computer (e.g., a server, a desktop computer, etc.) and/or another type of computation and/or communication device. Additionally, or alternatively, network device 220 may include one or more traffic processing and/or traffic transfer devices, such as a gateway, a router, a modem, a switch, a firewall, a network interface card, a hub, a bridge, a proxy server, an optical add-drop multiplexer, a mobile hotspot device, a tethering device, or another type of device that processes and/or transfers traffic. In some implementations, network device 220 may receive information from media device 270, such as a signal strength associated with mobile device 260. Network device 220 may provide, to media device 270 and/or home node 280, a notification to activate home node 280 based on the information received from media device 270.

Customer premise 230 may include a residential, commercial, and/or industrial entity that is connected to network 210. Customer premise 230 may be connected to network 210 using, for example, a fiber optic connection, a coaxial connection, a satellite connection, and/or another type of wired or wireless connection. In some implementations, gateway device 250 may be used to connect customer premise 230 to network 210. For example, for a fiber optic connection, an optical network terminal (ONT) may convert optical signals into an electrical format that can be used by gateway device 250. Alternatively, the functionality of the ONT may be incorporated into gateway device 250. Customer premise 230 may include multiple devices, such as gateway device 250, mobile device 260, media device 270, and home node 280. Devices included in customer premise 230 may connect via customer premises network 240.

Customer premises network 240 may include one or more wired and/or wireless networks that connect devices included in customer premise 230. For example, customer premises network 240 may include a radio transmission network (e.g., a radiofrequency link, a short-range radio link, a long-range radio link, Bluetooth, WiFi, etc.), a wired network (e.g., using a coaxial cable, a Telecommunications Industry Association (TIA) cable, such as a category 5 cable or a category 3 cable, or any other wired connection), a wireless network (e.g., a network device that operates using the Institute of Electrical and Electronics Engineers ("IEEE") 802.11 wireless LAN standards, etc.), a local area network, an intranet, and/or a combination of these or other types of networks.

Gateway device 250 may include one or more traffic processing and/or traffic transfer devices, such as a gateway, a router, a modem, a switch, a firewall, a network interface card, a hub, a bridge, a proxy server, an optical add-drop multiplexer, a mobile hotspot device, a tethering device, and/or another type of device that processes and/or transfers traffic. Gateway device 250 may connect devices included in customer premise 230 (such as media device 270 and/or home node 280) to network 210 and/or network device 220.

Mobile device 260 may include a computation and/or communication device, such as a wireless mobile communication device, that is capable of communicating with home node 280, base station 290, and/or a network (e.g., radio access network 295). For example, mobile device 260 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a tablet computer, a laptop computer, and/or another type of mobile computation and communication device. Mobile device 260 may send traffic to and/or receive traffic from radio access network 295 (e.g., via home node 280 and/or base station 290). Additionally, or alternatively, mobile device 260 may communicate with media device 270 (e.g., via customer premises network 240).

Media device 270 may include any device capable of processing information received from and/or transmitted to network 210. In some implementations, media device 270 may be a closed device (e.g., including a hardware/software configuration that is not accessible to the general public) that restricts unauthorized alteration of programming delivered over a closed distribution network. Media device 270 may receive a television signal from gateway device 250, may convert the signal to a form usable by a display device (e.g., a television, not shown), and may transmit the signal to the display device for display. For example, media device 270 may include a set-top box, a television box, a computer, a cable card, and/or a portable electronic device. Additionally, or alternatively, media device 270 may include a cable modem, a home security monitoring system, an energy use monitor, and/or a charging station. In some implementations, media device 270 may receive information (e.g., a signal strength, a global positioning system ("GPS") location, etc.) from mobile device 260. Additionally, or alternatively, media device 270 may include home node 280.

Home node 280 may include one or more devices that receive, process, and/or transmit traffic, such as audio, video, text, and/or other data, destined for and/or received from mobile device 260. In some implementations, home node 280 may include a base station and/or a microcell, such as a femtocell or a picocell, that may connect mobile device 260 to radio access network 295. For example, home node 280 may include a 3G femtocell (e.g., a Home NodeB ("HNB")) and/or an LTE femtocell (e.g., a Home eNodeB ("HeNB")).

While home node 280 is shown as separate from media device 270, in some implementations, home node 280 may be integrated into media device 270, and may be activated or deactivated based on signals received from network device 220 (e.g., via network 210, gateway device 250, customer premises network 240, and/or media device 270). For example, media device 270 and home node 280 may be implemented within the same housing as a single integrated device.

Base station 290 may include one or more devices that receive, process, and/or transmit traffic, such as audio, video, text, and/or other data, destined for and/or received from mobile device 260. In some implementations, base station 290 may include an evolved Node B ("eNB") associated with an LTE network (e.g., radio access network 295) that receives traffic from and/or sends traffic to a network via a packet data network gateway and/or a serving gateway. Additionally, or alternatively, base station 290 may be associated with a radio access network (e.g., radio access network 295) that is not associated with an LTE network. Base station 290 may send traffic to and/or receive traffic from mobile device 260 via an air interface. In some implementations, mobile device 260 may determine a signal strength associated with a connection between mobile device 260 and base station 290.

Radio access network 295 may include one or more wired and/or wireless networks. For example, radio access network 295 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network.

The number of devices and/or networks illustrated in FIG. 2 is provided for explanatory purposes. In practice, there may be additional devices and/or networks, fewer devices and/or networks, different devices and/or networks, or differently arranged devices and/or networks than those illustrated in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
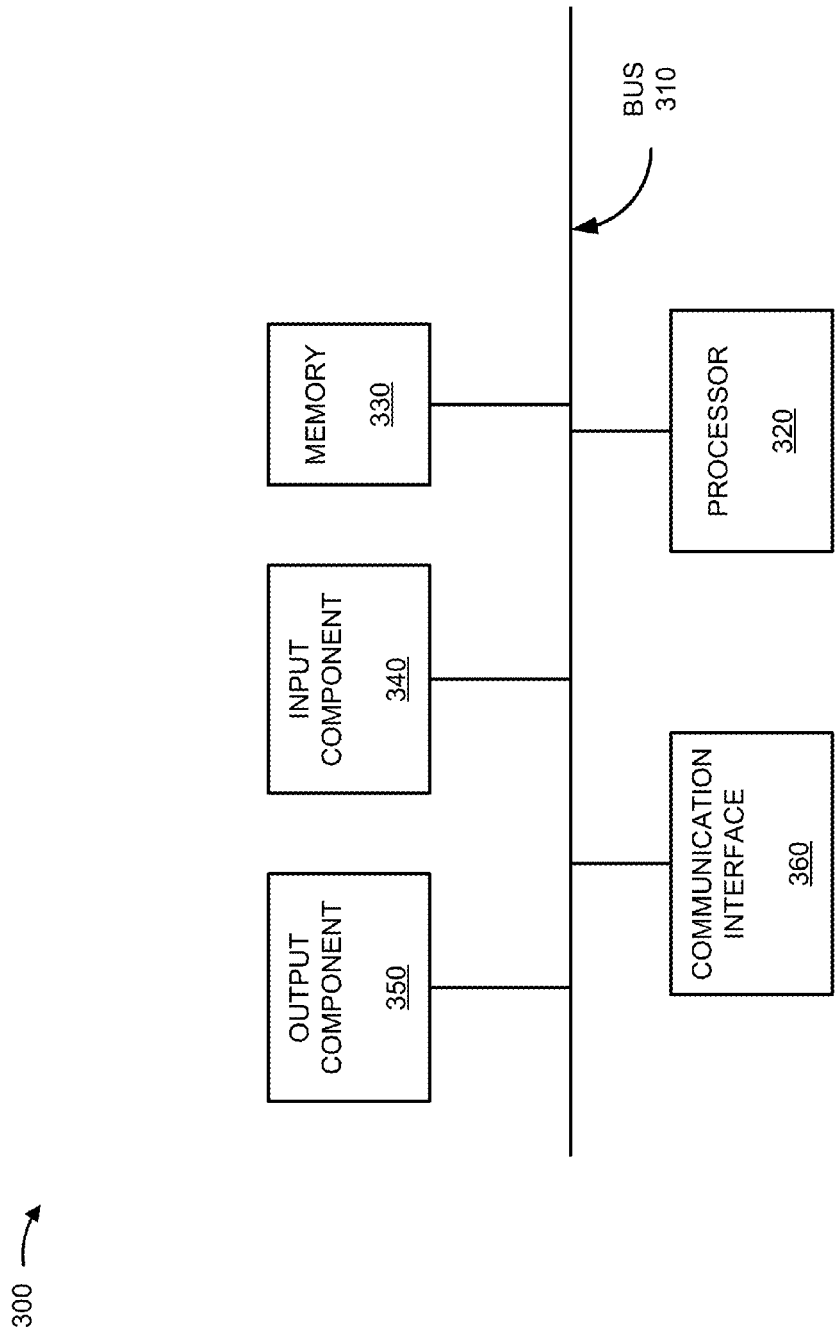
FIG. 3 is a diagram of example components of one or more devices of FIG. 2.

FIG. 3 is a diagram of example components of a device 300. Device 300 may correspond to network device 220, gateway device 250, mobile device 260, media device 270, home node 280, and/or base station 290. As illustrated, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and executes instructions. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include a mechanism for communicating with another device and/or system via a network, such as network 210, customer premises network 240, and/or radio access network 295. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3. Additionally, or alternatively, each of network device 220, gateway device 250, mobile device 260, media device 270, home node 280, and/or base station 290 may include one or more devices 300 and/or one or more components of device 300.

Figure 4:
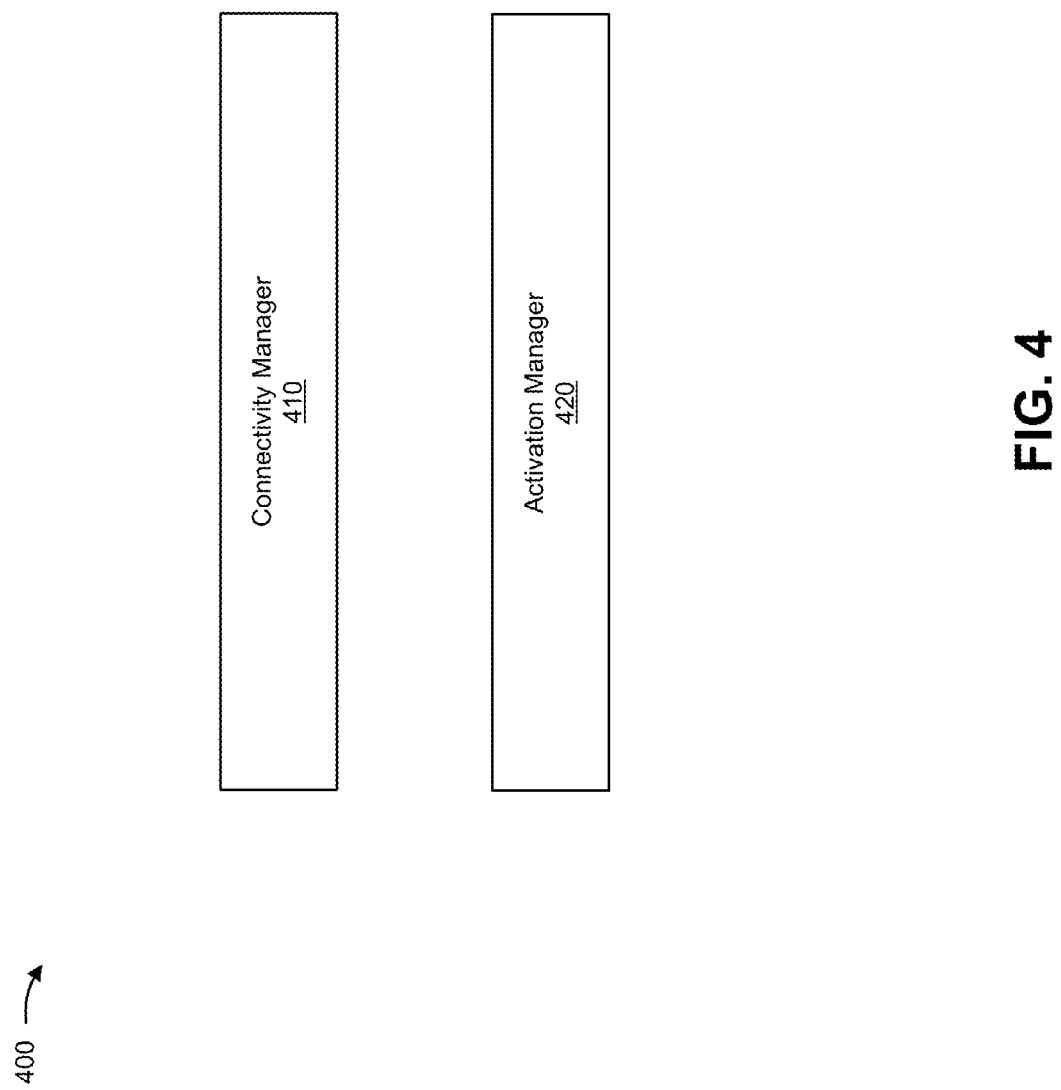
FIG. 4 is a diagram of example functional components of one or more devices of FIG. 2.

FIG. 4 is a diagram of example functional components of a device 400 that may correspond to media device 270. In another implementation, one or more of the example functional components of device 400 may be implemented by network device 220. In yet another implementation, one or more of the example functional components of device 400 may be implemented by another device or a collection of devices including or excluding network device 220 and/or media device 270. As illustrated, device 400 may include a connectivity manager 410 and an activation manager 420.

Connectivity manager 410 may perform operations associated with receiving, processing, and/or transmitting connectivity information. In some implementations, connectivity information may be associated with mobile device 260. For example, connectivity information may include information that identifies a signal strength associated with a connection between media device 260 and base station 290, such as a received signal strength indicator (RSSI) value, a signal to interference plus noise ratio (SINR) value, a power level of a radio signal received by mobile device 260 from base station 290, an indication that mobile device 260 is not receiving a radio signal, etc. Additionally, or alternatively, connectivity information may include a signal strength associated with a connection between media device 270 and base station 290, and/or an indication that media device 270 is not receiving a radio signal from base station 290. In some implementations, connectivity manager 410 may receive connectivity information from mobile device 260 and/or base station 290, and may transmit the connectivity information to network device 220.

Additionally, or alternatively, connectivity manager 410 may perform operations associated with receiving, processing, and/or transmitting location information. In some implementations, location information may be associated with mobile device 260. For example, location information may include information that identifies a geographic location of mobile device 260 (e.g., obtained from a GPS component of mobile device 260), an indication of whether mobile device 260 is within a wireless network range of media device 270 and/or home node 280 (e.g., within a short-range radio link range, a long-range radio link range, a Bluetooth link range, a WiFi link range, etc.), an indication of whether mobile device 260 is connected to customer premises network 240, an indication of whether mobile device 260 is connected to a charging station (e.g., a charging station integrated into or associated with media device 270) and/or is being charged (e.g., a battery associated with mobile device 260 is being charged), an estimated distance between mobile device 260 and media device 270 and/or home node 280 (e.g., based on a signal strength associated with a short-range radio link, a long-range radio link, a Bluetooth link, a WiFi link, etc.), etc. In some implementations, connectivity manager 410 may receive location information from mobile device 260, and may transmit the location information to network device 220.

Activation manager 420 may perform operations associated with activating and/or deactivating home node 280. For example, activation manager 420 may receive connectivity information, location information, and/or other information from connectivity manager 410, and may compare the received information to activation criteria or deactivation criteria (e.g., criteria received and/or stored by activation manager 420). Based on the comparison, activation manager 420 may determine that home node 280 should be activated or deactivated, and may send a notification, to media device 270 and/or home node 280, to activate or deactivate home node 280. For example, activation manager 420 may receive an indication that mobile device 260 is associated with an RSSI value below a predetermined threshold, and may transmit a notification to activate home node 280. Activation manager 420 may activate home node 280 based on the notification.

Additionally, or alternatively, activation manager 420 may perform operations associated with receiving, processing, and/or transmitting activation information. In some implementations, activation information may be associated with home node 280. For example, activation information may include information that identifies a date and/or time that home node 280 is activated or deactivated, a duration of time that home node 280 is active or inactive, a set of time periods that home node 280 is active or inactive, etc. In some implementations, activation manager 420 may receive activation information from media device 270 and/or home node 280, and may transmit the activation information to network device 220.

The number of functional components illustrated in FIG. 4 is provided for explanatory purposes. In practice, there may be additional functional components, fewer functional components, or different functional components than those illustrated in FIG. 4. Functional components 410-420 may be implemented using one or more devices 300 or one or more components of device 300. Network device 220, gateway device 250, mobile device 260, media device 270, and/or home node 280 may individually include all of the functional components depicted in FIG. 4, or the functional components depicted in FIG. 4 may be distributed singularly or duplicatively in any manner between the devices illustrated in FIG. 2.

Figure 5:
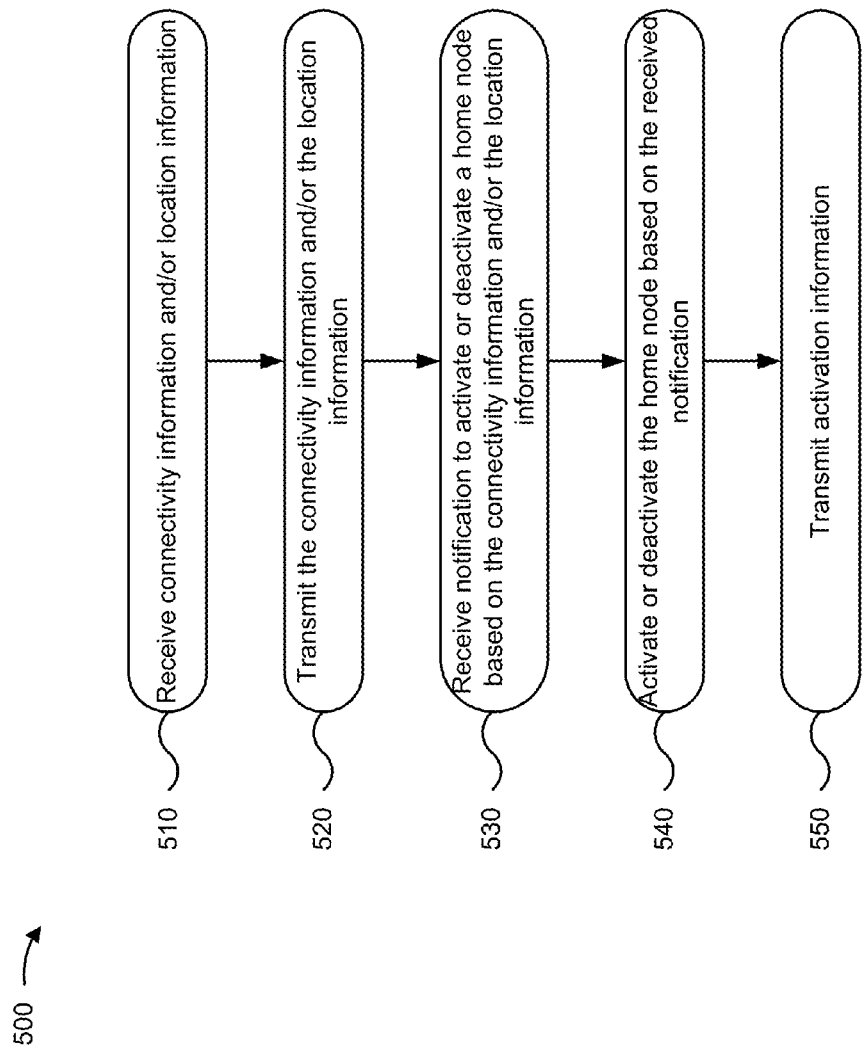
FIG. 5 is a diagram of an example process for activating or deactivating a home node according to an implementation described herein.

FIG. 5 is a diagram of an example process 500 for activating or deactivating a home node. In some implementations, one or more process blocks of FIG. 5 may be performed by one or more components of media device 270 and/or home node 280. In another implementation, one or more process blocks of FIG. 5 may be performed by one or more components of another device or a collection of devices including or excluding media device 270 and/or home node 280.

As shown in FIG. 5, process 500 may include receiving connectivity information and/or location information (block 510). In some implementations, media device 270 may receive the connectivity information and/or the location information from mobile device 260, as discussed herein in connection with FIG. 4. For example, media device 270 may receive an indication, from mobile device 260, that mobile device 260 is not receiving a signal from base station 290, or that a signal strength of a signal being received by mobile device 260 from base station 290 is below a predetermined threshold. Additionally, or alternatively, media device 270 may receive an indication that mobile device 260 is connected to customer premises network 240 (e.g., via a short-range radio link, a long-range radio link, a WiFi connection, a Bluetooth connection, etc.). For example, mobile device 260 may be running an application that monitors connectivity information (e.g., a signal strength associated with mobile device 260) and/or location information (e.g., a geographic location associated with mobile device 260), and provides the information to media device 270.

In some implementations, media device 270 may continuously receive the connectivity information and/or the location information. Alternatively, media device 270 may receive the connectivity information and/or the location information on a periodic basis (e.g., once per second, once per minute, once per hour, etc.). Additionally, or alternatively, media device 270 may receive the connectivity information and/or the location information based on a change in the connectivity information and/or the location information. For example, media device 270 may receive an indication that mobile device 260 is no longer connected to customer premises network 240. Additionally, or alternatively, media device 270 may receive an indication that a signal strength associated with mobile device 260 has crossed a threshold (e.g., has decreased below a predetermined threshold, or has increased above a predetermined threshold).

As further shown in FIG. 5, process 500 may include transmitting the connectivity information and/or the location information (block 520). For example, media device 270 may transmit the connectivity information and/or the location information to network device 220. In some implementations, media device 270 may continuously transmit the connectivity information and/or the location information. Alternatively, media device 270 may transmit the connectivity information and/or the location information on a periodic basis (e.g., once per second, once per minute, once per hour, etc.). Additionally, or alternatively, media device 270 may transmit the connectivity information and/or the location information based on a change in the connectivity information and/or the location information. For example, media device 270 may transmit an indication that mobile device 260 is no longer connected to customer premises network 240. Additionally, or alternatively, media device 270 may transmit an indication that a signal strength associated with mobile device 260 has crossed a threshold (e.g., has decreased below a predetermined threshold, or has increased above a predetermined threshold).

As still further shown in FIG. 5, process 500 may include receiving a notification to activate or deactivate a home node based on the connectivity information and/or the location information (block 530). In some implementations, network device 220 may compare the connectivity information and/or the location information to a set of criteria, as discussed herein in connection with FIG. 6. In some implementations, network device 220 may transmit a notification to activate or deactivate home node 280 based on the comparison, and the notification may be received by media device 270 and/or home node 280. Additionally, or alternatively, media device 270 may perform the comparison, and may activate or deactivate home node 280 based on the comparison, rather than transmitting the connectivity information and/or the location information to network device 220 to perform the comparison.

As still further shown in FIG. 5, process 500 may include activating or deactivating the home node based on the received notification (block 540). For example, media device 270 may activate or deactivate home node 280 (or home node 280 may activate or deactivate itself) based on the notification received from network device 220.

As still further shown in FIG. 5, process 500 may include transmitting activation information (block 550). In some implementations, media device 270 may transmit the activation information to network device 220, as discussed herein in connection with FIG. 4. In some implementations, media device 270 may transmit the activation information continuously and/or periodically (e.g., once per minute, once per hour, once per day, etc.). Additionally, or alternatively, media device 270 may transmit the activation information upon activation or deactivation of home node 280. For example, when home node 280 is activated or deactivated, media device 270 may transmit, to network device 220, a date of activation/deactivation, a time of activation/deactivation, a duration of activation/deactivation, etc.

While a series of blocks has been described with regard to FIG. 5, the order of the blocks may be modified in some implementations. Additionally, or alternatively, non-dependent blocks may be performed in parallel.

Figure 6:
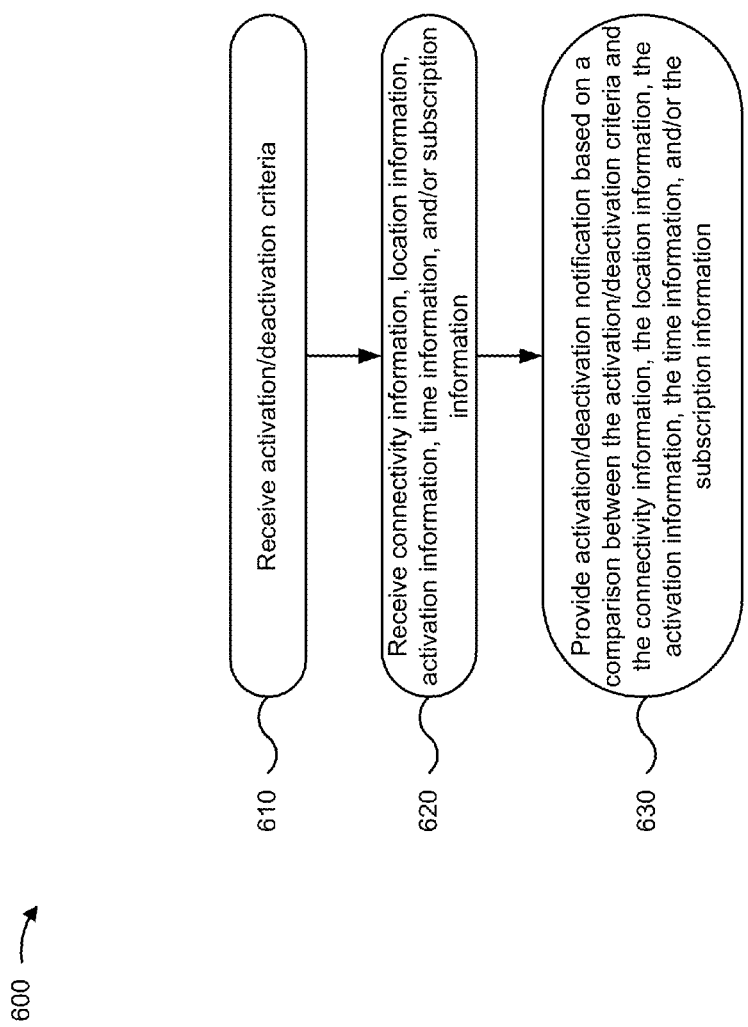
FIG. 6 is a diagram of an example process for activating or deactivating a home node according to an implementation described herein.

FIG. 6 is a diagram of an example process 600 for activating or deactivating a home node. In some implementations, one or more process blocks of FIG. 6 may be performed by one or more components of network device 220, media device 270, and/or home node 280. In another implementation, one or more process blocks of FIG. 6 may be performed by one or more components of another device or a collection of devices including or excluding network device 220, media device 270, and/or home node 280.

As shown in FIG. 6, process 600 may include receiving activation and/or deactivation criteria (block 610). In some implementations, network device 220 may receive and/or store a set of activation criteria and/or a set of deactivation criteria. Additionally, or alternatively, the criteria may be specified by a user (e.g., a network operator). The criteria may include, for example, a threshold associated with the connectivity information and/or the location information. For example, the criteria may include a threshold for a signal strength associated with mobile device 260 and/or media device 270, a threshold for an RSSI value associated with mobile device 260 and/or media device 270, a threshold for an SINR value associated with mobile device 260 and/or media device 270, a threshold associated with an estimated distance between mobile device 260 and media device 270, etc. Additionally, or alternatively, the criteria may include whether mobile device 260 and/or media device 270 is/are receiving a radio signal, whether mobile device 260 is within a wireless network range of media device 270 and/or home node 280, whether mobile device 260 is connected to customer premises network 240, whether mobile device 260 is connected to a charging station (e.g., associated with media device 270), whether mobile device 260 is located within a particular geographic location, etc.

In some implementations, the criteria may include time information. Time information may include, for example, information that identifies a time period during which home node 280 may be activated or deactivated (e.g., a time of day, such as after five (5) pm and before nine (9) pm, during which home node 280 may be activated, and/or a time of day, such as after nine (9) pm and before seven (7) am, during which home node 280 may be deactivated). Additionally, or alternatively, time information may include information that identifies a time limit for activation of home node 280 during a particular time period (e.g., a limit of three (3) hours per day that home node 280 may be active).

In some implementations, the criteria may include subscription information. Subscription information may include, for example, an indication of whether customer premise 230, gateway device 250, mobile device 260, media device 270, and/or home node 280 is associated with a subscription that allows home node 280 to be activated. For example, a customer associated with customer premise 230, gateway device 250, mobile device 260, media device 270, and/or home node 280 may purchase a subscription that allows home node 280 to be activated. In some implementations, there may be multiple subscription tiers, with each tier permitting activation of home node 280 based on different activation criteria (e.g., different time limits, different times of day, etc.).

Returning to FIG. 6, process 600 may include receiving connectivity information, location information, activation information, time information, and/or subscription information (block 620). In some implementations, network device 220 may receive the information from media device 270 and/or home node 280. Network device 220 may receive some or all of the information continuously and/or periodically (e.g., every minute, every hour, every day, etc.). Additionally, or alternatively, network device 220 may receive some or all of the information based on a change in the information.

As further shown in FIG. 6, process 600 may include providing an activation or deactivation notification based on a comparison between the activation or deactivation criteria and the connectivity information, the location information, the activation information, the time information, and/or the subscription information (block 630). In some implementations, the criteria may include a threshold associated with the connectivity information. For example, network device 220 may provide an activation or deactivation notification to media device 270 when a signal strength (e.g., an RSSI value and/or an SINR value) associated with mobile device 260 and/or media device 270 crosses a threshold (e.g., decreases below a threshold, or increases above a threshold). Additionally, or alternatively, network device 220 may provide an activation or deactivation notification to media device 270 when mobile device 260 and/or media device 270 is not receiving a radio signal (e.g., from base station 290). For example, mobile device 260 and/or media device 270 may include an application or hardware that monitors signal strength.

In some implementations, the criteria may include a threshold associated with the location information. For example, network device 220 may provide an activation or deactivation notification to media device 270 when a physical distance between mobile device 260 and media device 270 and/or home node 280 crosses a threshold. In some implementations, the physical distance may be determined using a signal strength of a wireless connection between mobile device 260 and media device 270 and/or between mobile device 260 and home node 280. Additionally, or alternatively, the physical distance may be determined by calculating the distance between a GPS location of mobile device 260 and a GPS location of media device 270 and/or home node 280.

Additionally, or alternatively, network device 220 may provide an activation or deactivation notification to media device 270 when mobile device 260 is located within a predetermined geographic location (e.g., obtained from a GPS component of mobile device 260). For example, an activation notification may be provided when mobile device 260 enters a geographic area associated with a low signal strength (e.g., below a threshold) or no signal strength, or when mobile device 260 departs a geographic area associated with a high signal strength (e.g., above a threshold). Additionally, or alternatively, a deactivation notification may be provided when mobile device 260 departs a geographic area associated with a low signal strength (e.g., below a threshold) or no signal strength, or when mobile device 260 enters a geographic area associated with a high signal strength (e.g., above a threshold). In some implementations, the geographic location of mobile device 260 may be transmitted to network device 220 via media device 270 and/or home node 280.

Additionally, or alternatively, network device 220 may provide an activation or deactivation notification to media device 270 when mobile device 260 is located within a wireless network range (e.g., the devices may communicate using a wireless network) of media device 270 and/or home node 280. For example, an activation notification may be provided when mobile device 260 enters a wireless network range (e.g., a short-range radio link range, a long-range radio link range, a Bluetooth link range, a WiFi link range, etc.) associated with media device 270 and/or home node 280. Additionally, or alternatively, an activation notification may be provided when mobile device 260 is connected to customer premises network 240. Additionally, or alternatively, a deactivation notification may be provided when mobile device 260 departs a wireless network range associated with media device 270 and/or home node 280.

Additionally, or alternatively, network device 220 may provide an activation or deactivation notification to media device 270 when mobile device 260 is connected to a charging station (e.g., a charging station associated with and/or included in media device 270). For example, network device 220 may provide a notification to deactivate home node 280 when mobile device 260 is connected to the charging station.

In some implementations, the criteria may include a threshold associated with the activation information. For example, network device 220 may provide a deactivation notification to media device 270 when an amount of time that home node 280 is active during a particular time period crosses a threshold (e.g., when home node 280 is active for more than four (4) hours in a day).

In some implementations, the criteria may be associated with the time information. For example, network device 220 may provide an activation or deactivation notification to media device 270 at a particular time (e.g., at a particular time of day, on a particular day of the week, etc.).

In some implementations, the criteria may be associated with the subscription information. For example, network device 220 may provide an activation or deactivation notification to media device 270 when customer premise 230, gateway device 250, mobile device 260, media device 270, and/or home node 280 is associated with a subscription that allows home node 280 to be activated.

In some implementations, network device 220 may use any combination of multiple criteria to determine whether to provide the activation or deactivation notification to media device 270. For example, network device 220 may provide an activation notification to media device 270 when mobile device 260 is associated with a low signal strength (e.g., below a threshold), when mobile device 260 is associated with a particular geographic location, when home node 280 has not been activated for more than a threshold amount of time in a day, when the current time is between nine (9) am and five (5) pm, and when media device 270 is associated with a subscription.

Additionally, or alternatively, network device 220 may assign weights to the criteria (e.g., based on a user-specified weighting). For example, network device 220 may assign a greater weight to the signal strength associated with mobile device 260 than the weight assigned to the geographic location of mobile device 260. Network device 220 may combine multiple weighted criteria to produce a weighted score, and may provide an activation or deactivation notification based on a comparison between the weighted score and a threshold.

In some implementations, network device 220 may provide an option for a user to subscribe to a service in order to activate home node 280. For example, a subscription notification may be sent to a user device, such as mobile device 260 or another user device (e.g., a computer associated with customer premises network 240), based on the comparison between the activation/deactivation criteria and the connectivity information, the location information, the activation information, the time information, and/or the subscription information.

For example, network device 220 may determine that mobile device 260 is associated with a low signal strength, and that customer premises 230 is not associated with a subscription that allows home node 280 to be activated. Based on the determination, network device 220 may send a notification to a user device, indicating that mobile device 260 is associated with a low signal strength, and informing the user that a subscription service is available to increase the signal strength. Network device 220 may receive a subscription request from the user device, and may send an activation notification to media device 270 based on the subscription request.

While a series of blocks has been described with regard to FIG. 6, the order of the blocks may be modified in some implementations. Additionally, or alternatively, non-dependent blocks may be performed in parallel.

Figure 7:
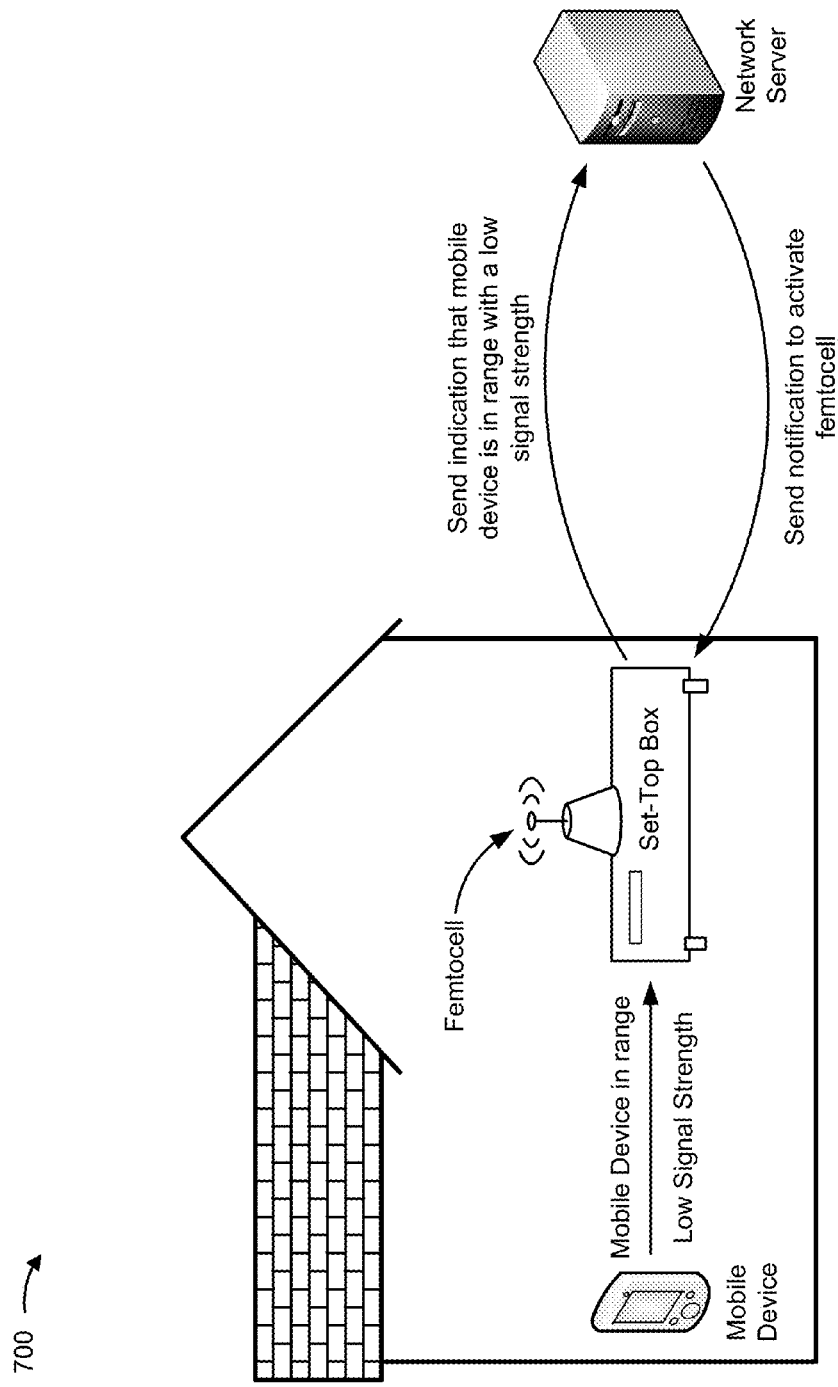
FIG. 7 is a diagram of an example implementation of activating a home node.

FIG. 7 is a diagram of an example implementation 700 of activating a home node. As illustrated, implementation 700 may include a network server (which may correspond to network device 220), a mobile device (which may correspond to mobile device 260), and a set-top box (which may correspond to media device 270) that includes a femtocell (which may correspond to home node 280).

As illustrated in FIG. 7, the set-top box may determine that the mobile device is within range (e.g., is in communication with the set-top box via a wireless network, such as customer premises network 240), and may receive an indication that the mobile device is receiving a low signal strength (e.g., from a base station, not shown). The set-top box may transmit, to the network server, an indication that the mobile device is in range of the set-top box (or the femtocell), and that the mobile device is associated with a low signal strength (or no signal strength). The network device may determine that these conditions associated with the mobile device satisfy a set of stored activation criteria, and may transmit, to the set-top box, a notification to activate the femtocell. Upon receiving the notification, the set-top box may activate the femtocell, which may be integrated into the set-top box.

The example implementation illustrated in FIG. 7 is provided for explanatory purposes. In practice, additional information and/or criteria, less information and/or criteria, and/or different information and/or criteria may be used to determine whether to activate or deactivate home node 280.

Figure 8:
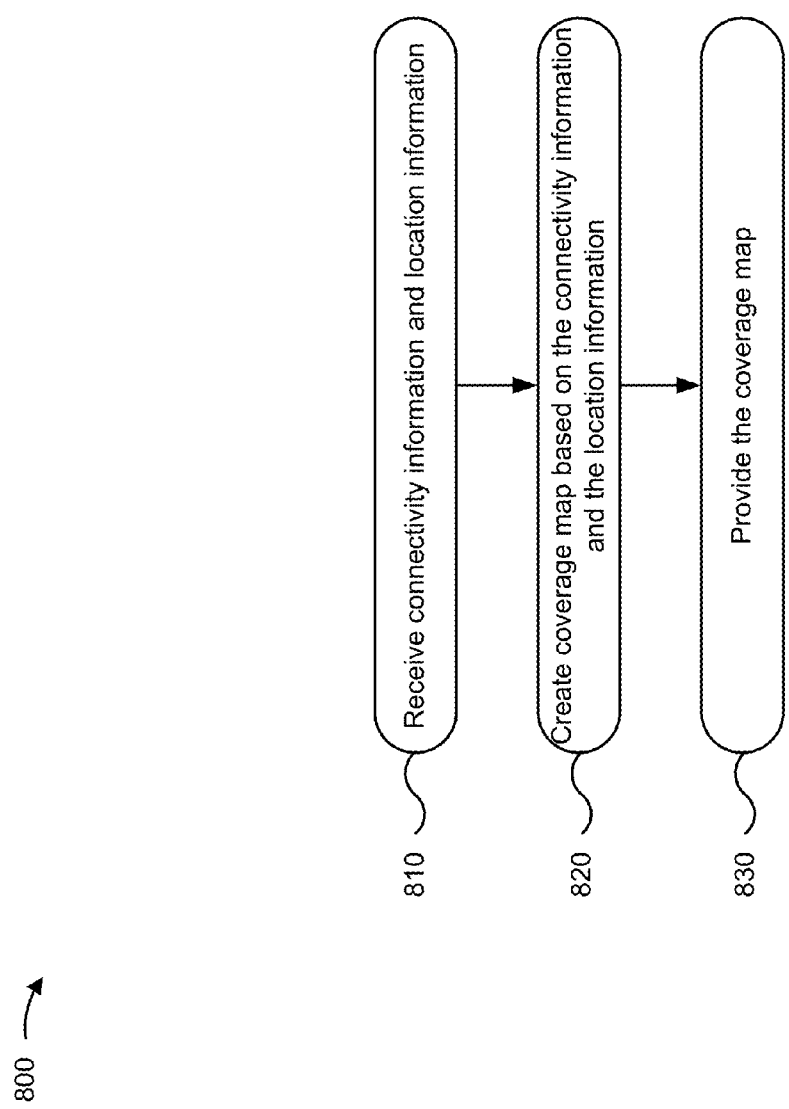
FIG. 8 is a diagram of an example process for creating a coverage map according to an implementation described herein.

FIG. 8 is a diagram of an example process 800 for creating a coverage map. In some implementations, one or more process blocks of FIG. 8 may be performed by one or more components of network device 220. In another implementation, one or more process blocks of FIG. 8 may be performed by one or more components of another device or a collection of devices including or excluding network device 220.

As shown in FIG. 8, process 800 may include receiving connectivity information and location information (block 810). In some implementations, network device 220 may receive the connectivity information and the location information, as discussed herein in connection with FIGS. 4 and 6. For example, network device 220 may receive information that identifies a geographic location associated with mobile device 260 (e.g., via GPS information, triangulation information, etc., that may be transmitted via media device 270), and may receive information that identifies a signal strength associated with mobile device 260 at the geographic location (e.g., which may be transmitted via media device 270). Additionally, or alternatively, network device 220 may receive information that identifies one or more base stations (e.g., base station 290) that provide service (e.g., cellular service) to customer premise 230 and/or media device 270.

In some implementations, network device 220 may continuously receive the information, or may receive the information periodically (e.g., every minute, every hour, every day, etc.). Additionally, or alternatively, network device 220 may receive the information when the memory space occupied by the information exceeds a threshold (e.g., when media device 270 has stored more than 1 gigabyte of connectivity and/or location information).

As further shown in FIG. 8, process 800 may include creating a coverage map based on the connectivity information and the location information (block 820). The coverage map may provide an indication of a signal strength at different geographic and/or physical locations (e.g., within a building). For example, the coverage map may identify a signal strength associated with mobile device 260 at a particular geographic and/or physical location. In some implementations, network device 220 may receive multiple signal strength values associated with a particular location, and may average the signal strength values to identify an average signal strength associated with the location.

As still further shown in FIG. 8, process 800 may include providing the coverage map (block 830). For example, network device 220 may transmit the coverage map to another device. Additionally, or alternatively, the coverage map may be displayed by network device 220 or the other device.

While a series of blocks has been described with regard to FIG. 8, the order of the blocks may be modified in some implementations. Additionally, or alternatively, non-dependent blocks may be performed in parallel.

Figure 9:
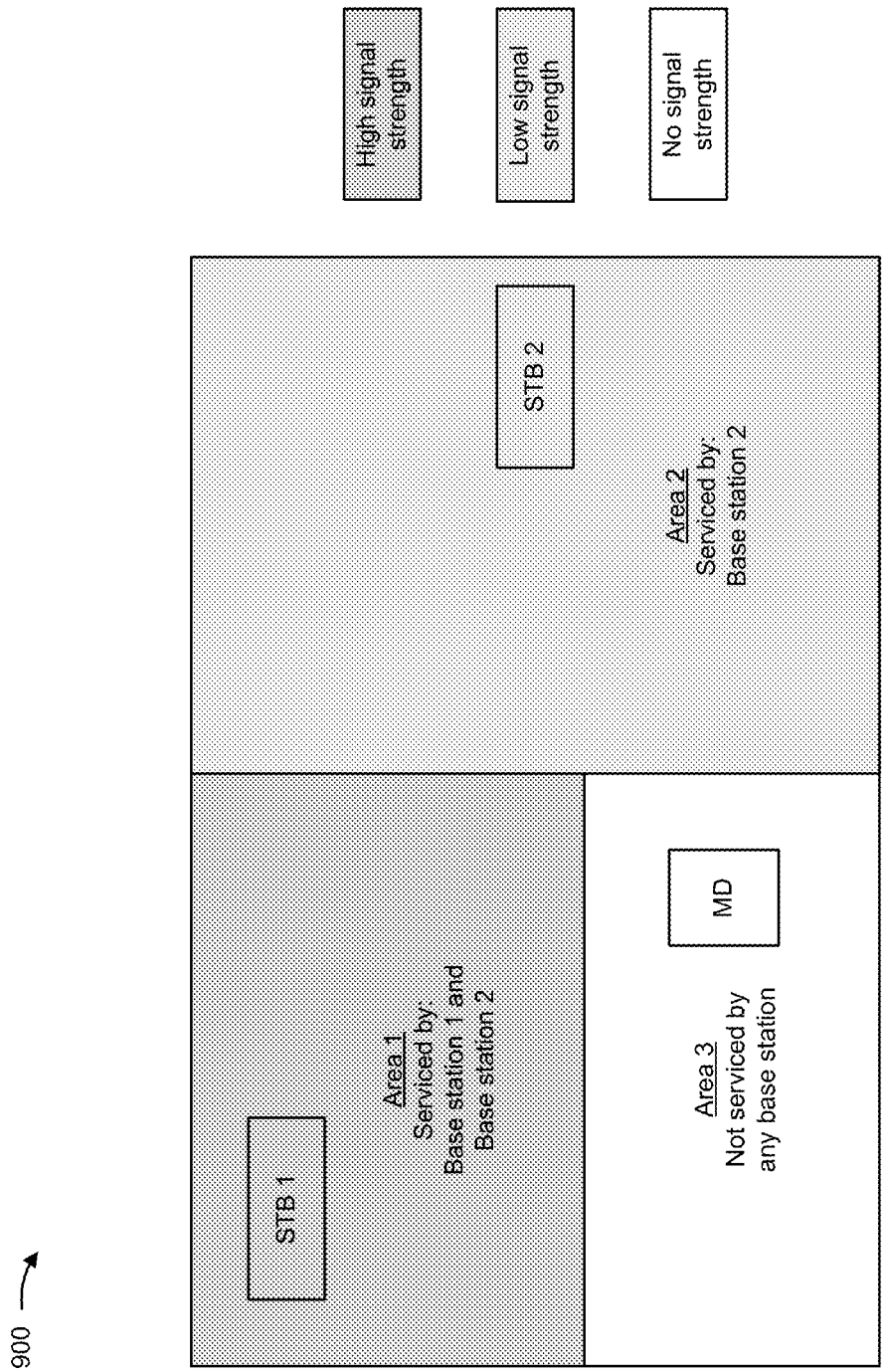
FIG. 9 is a diagram of an example coverage map that may be created according to an implementation described herein.

FIG. 9 is a diagram of an example coverage map 900. Coverage map 900 shows a first area ("Area 1") associated with a high signal strength (e.g., above a threshold), a second area ("Area 2") associated with a low signal strength (e.g., below a threshold), and a third area ("Area 3") associated with no signal strength (e.g., a signal strength of zero).

In some implementations, the signal strength at a location may be determined based on a signal strength indicator associated with a set-top box (e.g., "STB 1" and/or "STB 2," which may correspond to media device 270) and a geographic location associated with the set-top box (e.g., determined from a GPS or triangulation component included in the set-top box). Additionally, or alternatively, the signal strength at a location may be determined based on a signal strength associated with a mobile device (e.g., "MD," which may correspond to mobile device 260) and a geographic location associated with the mobile device. Additionally, or alternatively, the signal strength at a location may be determined based on a signal strength associated with a mobile device and a distance between the mobile device and the set-top box. The geographic location and/or the distance may be associated with the signal strength (e.g., may be determined substantially simultaneously, or within a particular time period, such as a one second time period or a one minute time period).

Coverage map 900 may provide an indication of a signal strength associated with different locations (e.g., in a building). For example, coverage map 900 may include a layout of a building or a floor in a building, and may display different areas of the layout in different colors to represent different signal strengths associated with the areas, as illustrated. Additionally, or alternatively, coverage map 900 may provide an indication of areas of the building that are serviced by a base station. For example, Area 1 is serviced by two base stations, identified as "Base station 1" and "Base station 2." Area 2 is serviced by one base station, identified as "Base station 2."

Coverage map 900 may be used to determine the signal strength associated with different areas inside of a building. Additionally, or alternatively, coverage map 900 may be used to determine areas whether and/or where a base station should be installed in order to increase signal coverage inside of a building. Additionally, or alternatively, coverage map 900 may be used to determine whether and/or where a femtocell and/or picocell should be installed and/or activated in order to increase signal coverage inside of a building.

Implementations described herein may assist network providers in determining network coverage inside of a building. Additionally, implementations described herein may allow a network provider to increase the signal strength of devices located within the building.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive a signal strength indicator associated with a connection between a mobile device and a first base station, the signal strength indicator indicating a strength of a radio signal received by the mobile device from the first base station;
   transmit the signal strength indicator to a network device;
   receive, from the network device and based on transmitting the signal strength indicator, a first notification to activate a second base station based on the signal strength indicator; and
   activate the second base station based on the first notification, the second base station providing temporary wireless connectivity for the mobile device.

2. The device of claim 1, where the second base station comprises a femtocell or a picocell, and where the second base station is implemented within a housing of the device.

3. The device of claim 1, where the signal strength indicator comprises at least one of:

a received signal strength indicator value that represents a measurement of power present in the radio signal received by the mobile device from the first base station;

a signal to noise plus interference ratio value that represents a measurement of quality associated with the radio signal received by the mobile device from the first base station; or a power level value associated with the connection between the mobile device and the first base station.

4. The device of claim 1, where the first notification is received based on a value associated with the single strength indicator being below a threshold value.

5. The device of claim 1, where the one or more processors, when receiving the first notification, are further to:
receive the first notification based on an indication that the second base station is associated with a subscription that allows the second base station to be activated.

6. The device of claim 1, where the one or more processors are further to:
transmit, to the network device, information that identifies a duration of time that the second base station is active during a time period;
receive, from the network device, a second notification to deactivate the second base station based on the duration of time exceeding a threshold; and
deactivate the second base station based on the second notification.

7. The device of claim 1, where the one or more processors are further to:
transmit, to the network device, an indication that the mobile device is being charged;
receive, from the network device, a second notification to deactivate the second base station based on the indication that the mobile device is being charged; and
deactivate the second base station based on the second notification.

8. A system, comprising:
one or more processors to:
receive information that identifies a signal strength threshold;
receive, from a first device, information that identifies a signal strength value associated with the first device or associated with a second device, the signal strength value indicating a strength of a radio signal received by the first device or the second device;
determine that the signal strength value is less than the signal strength threshold; and
transmit, to the first device and based on the determination, a first notification to activate a first base station associated with the first device, the first base station being activated by the first device based on the first notification.

9. The system of claim 8, where the first base station comprises a femtocell or a picocell.

10. The system of claim 8, where the signal strength value comprises at least one of:
a received signal strength indicator value that represents a measurement of power present in the radio signal received by the first device or the second device;
a signal to noise plus interference ratio value that represents a measurement of quality associated with the radio signal received by the first device or the second device; or
a power level value associated with a wireless connection between the first device or the second device and a base station other than the first base station.

11. The system of claim 8, where the one or more processors are further to:
receive an indication that the first device is associated with a subscription that allows the first base station to be activated; and
where the one or more processors, when transmitting the first notification, are further to:
transmit the first notification based on the indication that the first device is associated with the subscription.

12. The system of claim 8, where the one or more processors are further to:
receive, from the first device, information that identifies a duration of time that the first base station is active during a time period; and
transmit, to the first device, a second notification to deactivate the first base station based on the duration of time exceeding a threshold.

13. The system of claim 8, where the one or more processors are further to:
receive an indication of a distance between the first device and the second device; and
where the one or more processors, when transmitting the first notification, are further to:
transmit the first notification based on the indication that the distance is less than a distance threshold.

14. The system of claim 8, where the one or more processors are further to:
receive an indication of a location associated with the second device, the location being associated with the signal strength value; and
provide a coverage map that indicates a signal strength value at the location.

15. A method, comprising:
receiving, by a set-top box, information that identifies a signal strength associated with a connection between a mobile device and a base station, the signal strength indicating a strength of a radio signal received by the mobile device from the base station;
transmitting, by the set-top box and to a network device, the information that identifies the signal strength;
receiving, by the set-top box and from the network device, a notification to activate a femtocell based on the information that identifies the signal strength, the femtocell being provided within a housing of the set-top box; and
activating, by the set-top box, the femtocell based on the notification.

16. The method of claim 15, where the information that identifies the signal strength comprises at least one of:
a received signal strength indicator value that represents a measurement of power present in the radio signal received by the mobile device from the base station;
a signal to noise plus interference ratio value that represents a measurement of quality associated with the radio signal received by the mobile device from the base station; or
a power level value associated with the connection between the mobile device and the base station.

17. The method of claim 15, where receiving the notification to activate the femtocell further comprises:
receiving the notification to activate the femtocell based on a value associated with the signal strength being below a threshold value.

18. The method of claim 15, where receiving the notification to activate the femtocell further comprises:
receiving the notification to activate the femtocell based on an indication that the set-top box, the mobile device, or the femtocell is associated with a subscription that allows the femtocell to be activated.

19. The method of claim 15, further comprising:
transmitting, to the network device, information that identifies a geographic location associated with the mobile device; and
where receiving the notification to activate the femtocell further comprises:
  receiving the notification to activate the femtocell based on the geographic location associated with the mobile device.

20. The method of claim 15, further comprising:
transmitting, to the network device, information that identifies a duration of time that the femtocell is active during a time period;
receiving, from the network device, a notification to deactivate the femtocell based on the duration of time exceeding a threshold; and
deactivating the femtocell based on the notification to deactivate the femtocell.

\* \* \* \* \*